United States Patent
Wehunt et al.

(10) Patent No.: US 9,914,872 B2
(45) Date of Patent: Mar. 13, 2018

(54) PROPPANTS

(71) Applicant: Chevron U.S.A. Inc., San Ramon, CA (US)

(72) Inventors: Clyde Dean Wehunt, Houston, TX (US); Amit Kumar Singh, Sugar Land, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 45 days.

(21) Appl. No.: 14/920,586

(22) Filed: Oct. 22, 2015

(65) Prior Publication Data

US 2016/0122630 A1 May 5, 2016

Related U.S. Application Data

(60) Provisional application No. 62/073,063, filed on Oct. 31, 2014.

(51) Int. Cl.
*C09K 8/80* (2006.01)
*C09K 8/70* (2006.01)
*E21B 43/267* (2006.01)

(52) U.S. Cl.
CPC ............... *C09K 8/80* (2013.01); *C09K 8/70* (2013.01); *E21B 43/267* (2013.01); *C09K 2208/12* (2013.01); *C09K 2208/22* (2013.01); *C09K 2208/32* (2013.01)

(58) Field of Classification Search
CPC ............ E21B 43/267; C09K 2208/12; C09K 2208/22; C09K 2208/32; C09K 8/70; C09K 8/80
See application file for complete search history.

(56) References Cited

U.S. PATENT DOCUMENTS

| 3,497,008 | A | 2/1970 | Graham et al. |
| 4,493,875 | A | 1/1985 | Beck et al. |
| 4,547,468 | A | 10/1985 | Jones et al. |
| 4,588,509 | A | 5/1986 | Hyde et al. |

(Continued)

FOREIGN PATENT DOCUMENTS

| EP | 2407525 | | 1/2012 |
| WO | 2008/026076 | | 3/2008 |
| WO | WO 2013/059793 | * | 4/2013 |

OTHER PUBLICATIONS

Pangilinan, Katrina D., et al.; "Polymers for Proppants Used in Hydraulic Fracturing"; 2016, Journal of Petroleum Science and Engineering, vol. 145, pp. 154-160.

*Primary Examiner* — Frances Tischler

(57) ABSTRACT

Embodiments of proppants are described herein. In one embodiment, a proppant for hydraulic fracturing includes a proppant body. The proppant body has a length (L) and an outside diameter (D), and the proppant body length (L) to the proppant body outside diameter (D) ratio (L/D) is about 0.3 to about 5.0. The proppant body includes a space frame, and the space frame includes a plurality of rigid members creating a plurality of openings allowing fluid to flow through the proppant thereby increasing permeability. In another embodiment, a proppant for hydraulic fracturing includes a substantially cylindrical proppant body with a substantially circular cross-sectional area and an internal flow path with a substantially circular cross-sectional.

13 Claims, 15 Drawing Sheets

(56) References Cited

U.S. PATENT DOCUMENTS

| | | |
|---|---|---|
| 4,681,245 A | 7/1987 | Harvey |
| 4,840,292 A | 6/1989 | Harvey |
| 4,867,931 A | 9/1989 | Cochran, Jr. et al. |
| 5,005,649 A | 4/1991 | Smith et al. |
| 5,595,245 A | 1/1997 | Scott, III |
| 5,785,121 A | 7/1998 | Dallas |
| 5,819,851 A | 10/1998 | Dallas |
| 5,927,403 A | 7/1999 | Dallas |
| 6,439,310 B1 | 8/2002 | Scott, III et al. |
| 6,817,421 B2 | 11/2004 | Dallas |
| 7,220,454 B2 | 5/2007 | Barron et al. |
| 7,562,583 B2 | 7/2009 | Conway et al. |
| 7,669,658 B2 | 3/2010 | Barron et al. |
| 7,737,091 B2 | 6/2010 | Windebank et al. |
| 7,776,255 B1 | 8/2010 | Wedding et al. |
| 7,790,656 B2 | 9/2010 | Windebank et al. |
| 7,798,227 B2 | 9/2010 | Misselbrook |
| 7,849,923 B2 | 12/2010 | Burukhin et al. |
| 7,950,455 B2 | 5/2011 | Kaufman et al. |
| 7,980,299 B1 | 7/2011 | Manulik |
| 8,006,759 B1 | 8/2011 | Cochran, Jr. et al. |
| 8,186,434 B2 | 5/2012 | Kaufman et al. |
| 8,562,900 B2 | 10/2013 | Alary et al. |
| 2003/0075326 A1 | 4/2003 | Ebinger |
| 2004/0224155 A1 | 11/2004 | Barron et al. |
| 2007/0029090 A1 | 2/2007 | Andrechuk et al. |
| 2008/0053657 A1 | 3/2008 | Alary et al. |
| 2008/0060444 A1 | 3/2008 | Conway et al. |
| 2008/0066910 A1 | 3/2008 | Alary et al. |
| 2008/0156490 A1 | 7/2008 | Burukhin et al. |
| 2009/0062154 A1 | 3/2009 | Windebank et al. |
| 2009/0178807 A1 | 7/2009 | Kaufman et al. |
| 2009/0308610 A1 | 12/2009 | Windebank et al. |
| 2010/0087341 A1 | 4/2010 | Alary et al. |
| 2010/0087342 A1 | 4/2010 | Alary et al. |
| 2010/0155065 A1 | 6/2010 | Misselbrook |
| 2011/0220355 A1 | 9/2011 | Kaufman et al. |
| 2011/0272156 A1 | 11/2011 | Johnson, Sr. |
| 2012/0145390 A1 | 6/2012 | Parse et al. |
| 2012/0149610 A1 | 6/2012 | Parse et al. |
| 2013/0146292 A1 | 6/2013 | Litvinets et al. |
| 2014/0021659 A1 | 1/2014 | Alary et al. |
| 2014/0345878 A1* | 11/2014 | Murphree ............ C09K 8/703 166/377 |

* cited by examiner

PROPPANTS

CROSS REFERENCE TO RELATED APPLICATIONS

This application claims benefit under 35 USC 119 of U.S. Provisional Patent Application No. 62/073,063 with a filing date of Oct. 31, 2014. This application claims priority to and benefits from the foregoing, the disclosure of which is incorporated herein by reference.

TECHNICAL FIELD

The present disclosure relates to proppants.

BACKGROUND

Hydraulic fracturing, also known as hydrofracturing and fracing, is a commonly used technique in the removal of hydrocarbons from a reservoir. Hydraulic fracturing increases the pressure in a rock formation until tensile strength or shear strength is exceeded to create fractures in the rock formation. The newly created fractures can provide passageways through which the hydrocarbons can travel to a wellbore or well. The newly created fractures can also increase the area of the reservoir that can be accessed by a single wellbore. Absent the newly created fractures in the rock formation, the permeability of the rock formation can be too low to allow hydrocarbons to be recovered at an economic rate.

Hydraulic fracturing involves injecting a fracturing fluid into the wellbore to a section of the wellbore that is exposed to the rock formation. The section is exposed to the rock formation either because there is no well casing at the depth of the rock formation or because holes have been intentionally made in the casing adjacent to the rock formation. The fracturing fluid is injected at a rate that is sufficient to increase local stresses to a value in excess of the strength of the rock formation. After the local stresses exceed the tensile or shear strength of the rock formation, fractures will form in the rock formation. Continuing to inject the fracturing fluid at a rate which exceeds the rate at which fluid can flow through the permeable portions within the rock formation will typically extend the fractures further into the formation.

When a fracture is sufficiently wide to allow proppants to flow into the fracture, proppants in the fracturing fluid are deposited in the newly created fractures during injection of the fracturing fluid. The proppants are meant to hold the newly created fractures open so that hydrocarbons can more easily flow to the wellbore. After the fracturing process is completed, the fracturing fluid is removed by flowing or pumping it back out of the wellbore so that the fracturing fluid does not block the flow of hydrocarbons to the wellbore. Although the fracturing fluid is removed, the proppants, which are typically solid particles, remain and can slow down or partially impede the flow of hydrocarbons to the wellbore (e.g., relative to flow through a completely open fracture of the same width).

Thus, the hydrocarbon industry is constantly searching for improved proppants.

SUMMARY

Embodiments of a proppant are described herein. In one embodiment, a proppant for hydraulic fracturing includes a proppant body. The proppant body has a length (L) and an outside diameter (D), and the proppant body length (L) to the proppant body outside diameter (D) ratio (L/D) is about 0.3 to about 5.0. The proppant body includes a space frame, and the space frame includes a plurality of rigid members creating a plurality of openings. The plurality of openings allowing fluid to flow through the proppant thereby increasing permeability.

In one embodiment, a proppant for hydraulic fracturing includes a substantially cylindrical proppant body with a substantially circular cross-sectional area and an internal flow path with a substantially circular cross-sectional area. The internal flow path allowing fluid to flow through the proppant thereby increasing permeability. The proppant body has a length (L) of about 0.5 mm to about 12.0 mm. The proppant body has an outside diameter (D) of about 0.15 mm to about 2.4 mm. The proppant body length (L) to the proppant body outside diameter (D) ratio (L/D) is about 0.3 to about 5.0. The internal flow path has a diameter (d) and the internal flow path diameter (d) to the proppant body outside diameter (D) ratio (d/D) is less than about 0.6. The proppant body is formed of a material with a compressive strength that is greater than or equal to about 9,000 psi.

DETAILED DESCRIPTION

Figure 1:
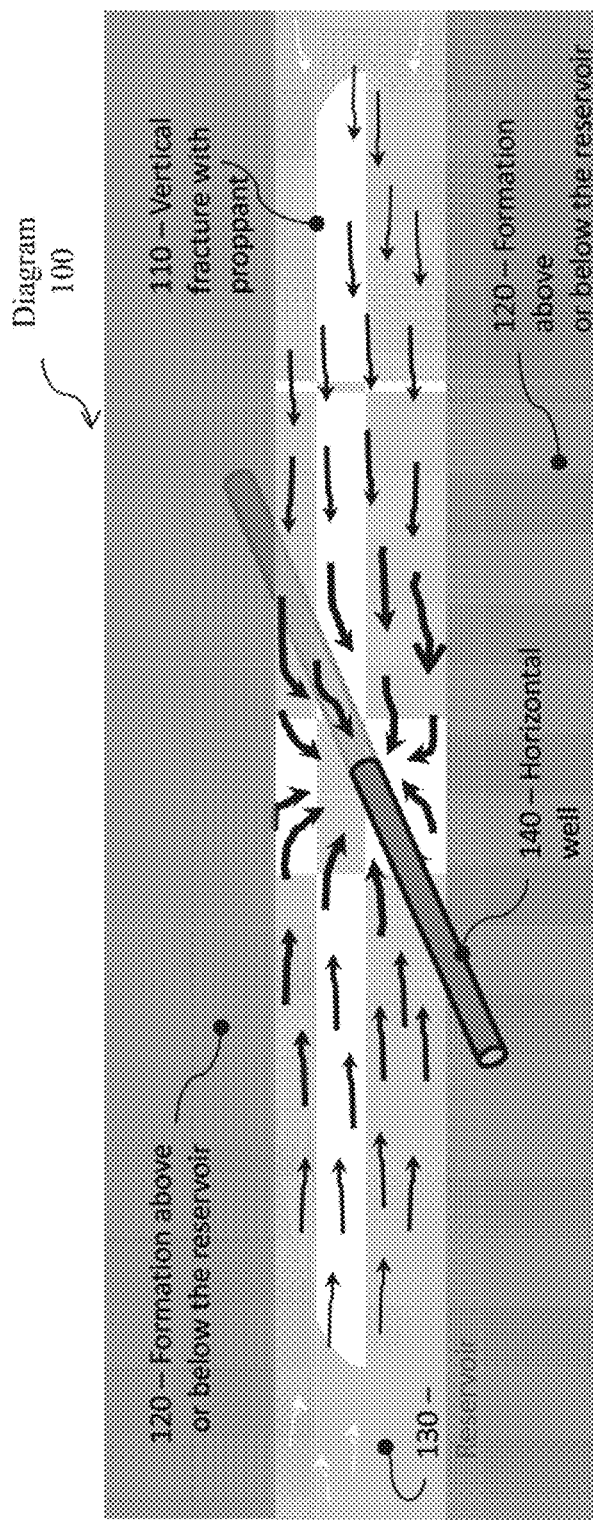
FIG. 1 is a diagram that illustrates an example of a horizontal intersected by a long vertical fracture containing a plurality of a proppants.

Embodiments of a proppant, as well as embodiments of a method of making a proppant and embodiments of hydraulic fracturing with a proppant consistent with this disclosure are described herein. FIG. 1 includes a diagram 100 that illustrates an example of a horizontal well (or wellbore) 140 intersected by a long vertical fracture 110 containing a plurality of a proppants. For example, as will be described further, provided herein are embodiments of a proppant with a space frame as well as embodiments of a proppant with a substantially cylindrical proppant body with a substantially circular cross-sectional area and an internal flow path with a substantially circular cross-sectional area (sometimes referred to as hollow cylinder shaped proppant or the like herein). A target reservoir 130 for the fracturing treatment can have other formations 120 above and below it.

Figure 2:
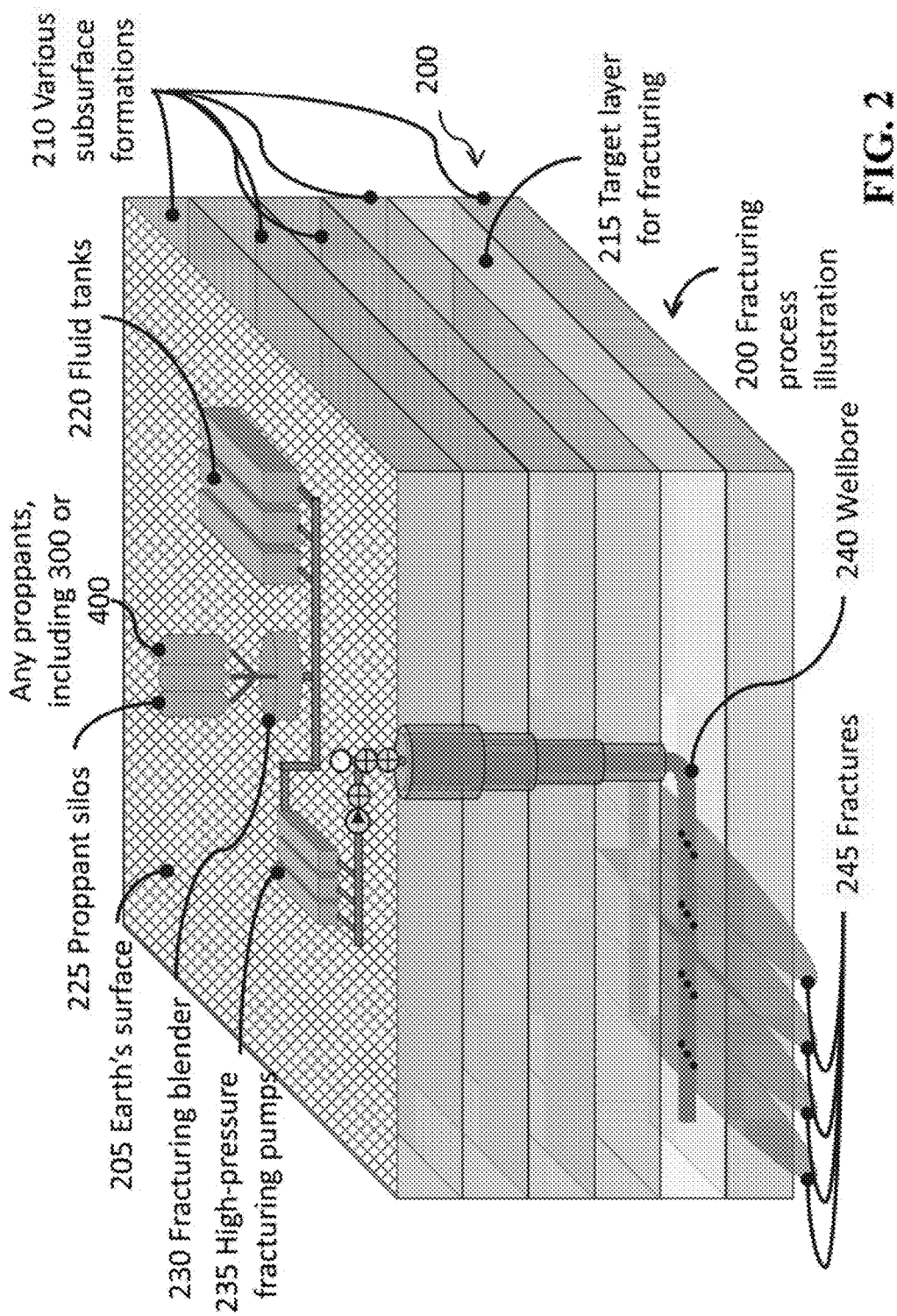
FIG. 2 illustrates a hydraulic fracturing process depicting an embodiment of a method for hydraulic fracturing.

FIG. 2 illustrates a hydraulic fracturing process 200 depicting an embodiment of a method for hydraulic fracturing. For example, FIG. 2 illustrates surface and subsurface components of the process 200. For ease of understanding, an earth surface 205, a hydraulic fracturing target formation 215, and other subterranean formations 210 are illustrated. Before and during the hydraulic fracturing process 200, fracturing fluid can be stored in at least one fluid tank 220, and at least one proppant can be stored in proppant storage devices, such as in at least one proppant silo 225. The at least one (proppant can be any proppant, including any mixture of the proppants consistent with this disclosure. A fracturing blender 230 can be used to mix proppants, fluids, and any additional chemical agents in the designed proportion and transfer them to at least one high-pressure fracturing pump 235, which then pump the mixture of proppants, fluids, and chemical agents into a wellbore 240 at the desired rate until the planned volume of all materials have been injected into the wellbore 240, or until materials can no longer be injected due to equipment limitations and by rising pressures during the treatment. The wellbore 240 can be of any size diameter, and can pass through the fracturing target formation 215 and the formations above or below 210 at any angle. The wellbore 240 can be described as a vertical wellbore, a deviated wellbore, or a horizontal wellbore depending on the circumstances. A plurality of proppants consistent with this disclosure can be deposited into at least one fracture 245 created by the hydraulic fracturing process 200.

Figure 3:
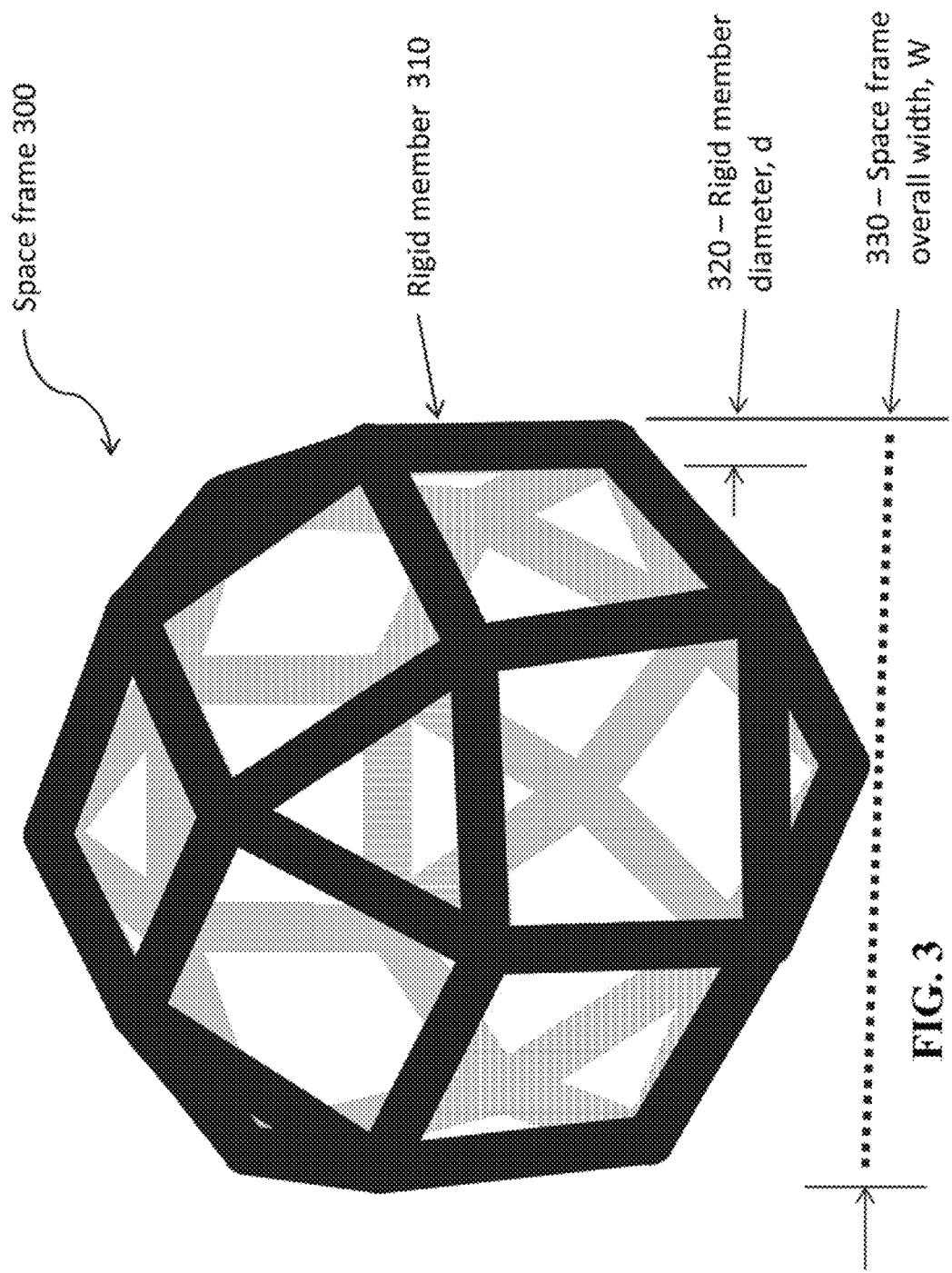
FIG. 3 illustrates an embodiment of a proppant, and more specifically, a proppant with a proppant body comprising a space frame with a plurality of rigid members.

In one example, a proppant for hydraulic fracturing can include a proppant body. The proppant body includes a space frame. The space frame includes a plurality of rigid members creating a plurality of openings. The plurality of openings allow fluid to flow through the proppant thereby increasing permeability. FIG. 3 illustrates an embodiment of a proppant 300 with a proppant body comprising a space frame with a plurality of rigid members. Specifically, the proppant 300, and space frame thereof can be made from rigid members 310 that are connected such that they form an irregular skeletal polyhedron with an overall width 330. Each rigid member 310 can have a rigid member diameter 320, and connected rigid members 310 can form openings in the proppant 300. The illustrated irregular skeletal polyhedron is substantially spherical; however, other shapes are possible and the overall geometry can also be characterized with other dimensions such as height and/or length in the event that the polyhedron is not substantially spherical. The illustrated irregular skeletal polyhedra proppant 300 can be formed by joining 6 square rigid member 310 frames and 8 equilateral triangle rigid member 310 frames at their vertices, where the rigid members 310 in the square and triangular frames are all about the same size. The proppant 300 has 26 openings and flow can pass through the proppant 300 in any direction, with almost no resistance to flow due to the large open flow area.

Alternatively, the proppant 300 can be made in the shape of any other irregular skeletal polyhedron. Alternatively, the proppant 300 can also be made from regular skeletal polyhedra. Alternatively, the rigid members 310 can be of round cross-sectional shape, square cross-sectional shape, or any other cross-sectional shape. Alternatively, at least one rigid member 310 can be solid, hollow, partially or completely filled with an agent, and/or combinations thereof. Other alternatives are also contemplated. For example, the space frame of the proppant 300 can include at least one rigid member 310 connecting a first portion of the space frame and a second portion of the space frame, or the space frame can include a plurality of joined polyhedra. Also, at least one rigid member 310 can have one or more internal flow paths, which may or may not be fully or partially filled with an agent. In another embodiment, the proppant may include a space frame that is a regular polyhedra, an irregular polyhedra, or any combination of regular and irregular polyhedra.

The agent can be practically any agent used in the production of hydrocarbons. For example, the agent can be at least one of a polymer, a surfactant, a fracturing gel breaker, a scale inhibitor, a corrosion inhibitor, a paraffin inhibitor, a hydrate inhibitor, an asphaltene inhibitor, an emulsion inhibitor, a mutual solvent, a clay stabilizer, a tracer, or any combination thereof. Depending on the embodiment, at least a portion of the agent can dissolve, exit, and/or be removed from the flow path. Alternatively, at least a portion of the agent can remain in the flow path. Of note, the term tracer refers to a substance that is designed to allow easy identification of the presence or concentration of the material. Examples of tracers can include radioactive isotopes, soluble chemicals which will dissolve into flowing liquids, materials which alter the magnetic properties of a substance, or combinations thereof.

Thus, in some embodiments, the agent is dissolvable, and the fluid can flow via the flow path (e.g., through the rigid member) after the agent dissolves. In some embodiments, the agent is removable, and the fluid can flow via the flow path (e.g., through the rigid member) after the agent is removed. In some embodiments, the agent is used to detect a location of the proppant, a location of a fracture containing the proppant, or both.

Figure 4:
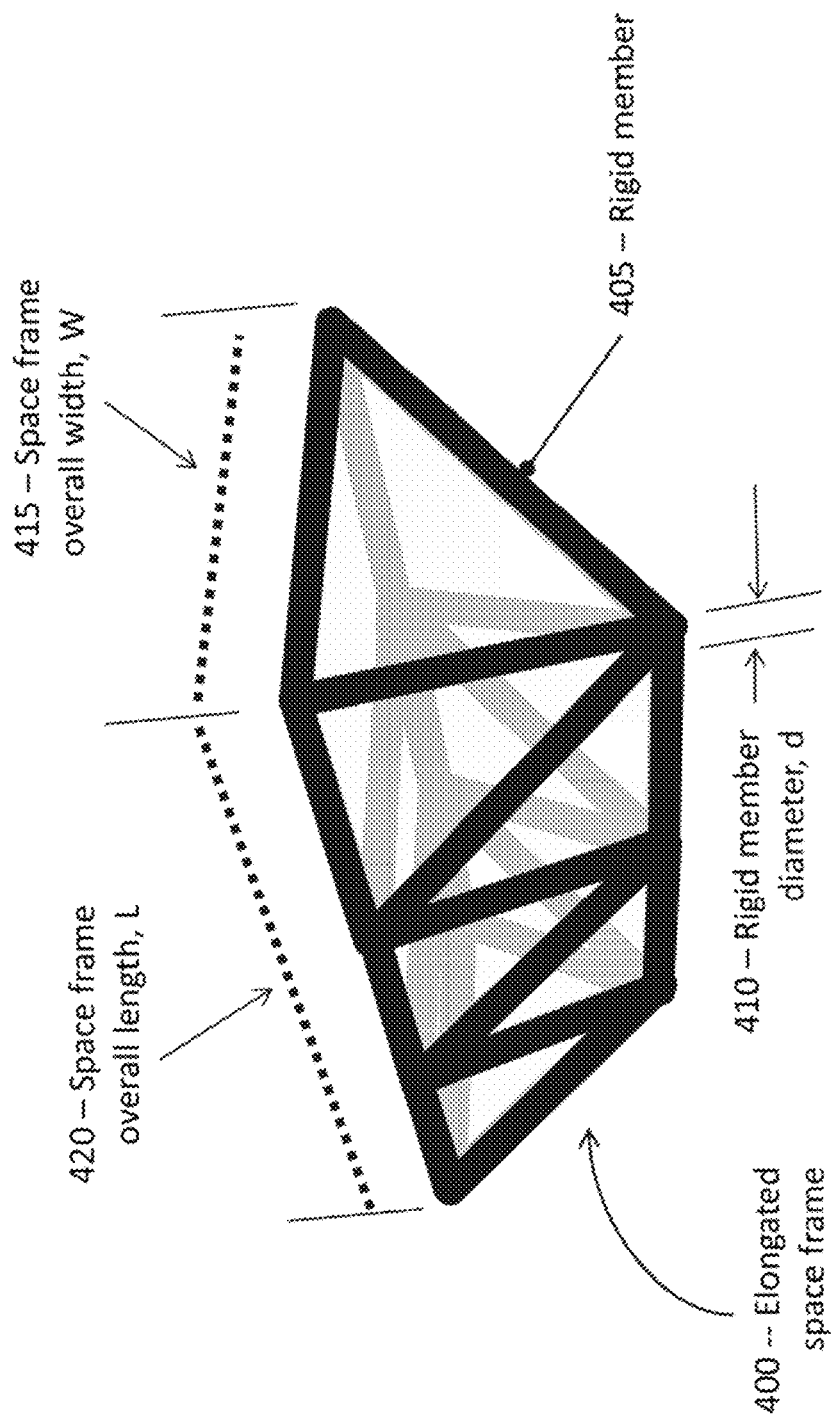
FIG. 4 illustrates another embodiment of a proppant, and more specifically, another proppant with a proppant body comprising a space frame with a plurality of rigid members.

FIG. 4 illustrates another embodiment of a proppant, and specifically, a proppant 400 that is made from a plurality of connected irregular polyhedra, with each irregular polyhedron comprised of rigid members 405. The proppant 400 can be similar to the proppant 300 of FIG. 3 and can include a space frame. Furthermore, the multiple polyhedra can be connected in such a way that the (L) or overall length 420 of the proppant 400 is different from the overall width W 415, such that the proppant 400 is elongated and is not substantially spherical.

For another example, in a particular embodiment, a proppant for hydraulic fracturing can include proppant body. The proppant body can include a first opening and a second opening, and a flow path of the proppant body. The flow path can extend from the first opening of the proppant body to the second opening of the proppant body. The flow path can allow fluid to flow through the proppant body via the flow path in addition to flowing around the proppant body, thereby increasing permeability. In another embodiment, the proppant body can include at least a first end and a second end. The first end includes the first opening and the second end includes the second opening. The flow path extends from the first opening of the first end to the second opening of the second end.

Alternative embodiments of the proppant are also provided herein. For example, a (proppant for hydraulic fracturing includes a proppant body. The proppant body is shaped like a cylinder. The cylinder has an internal flow-path substantially circular cross-section. For such a cylinder, the length L of the cylinder could be much longer than the outside diameter D, or L could be much shorter than D, so that the length to diameter ratio (L/D) could take on almost any positive value. Also, with an internal diameter d, the internal to external diameter ratio (d/D) could take on almost any value greater than about 0 and less than about 1. The ratio L/D and also d/D are important design variables for such a cylindrical shaped proppant with an internal flow path, as will be shown herein. For example, a proppant with a very short length L and high diameter D would be shaped like a coin, whereas a proppant with a very high length L and a very low diameter D would be shaped like a strand of spaghetti. For another example, the internal to external diameter ratio (d/D) for a cylindrical-shaped proppant with an internal flow path of approximately circular cross section can vary from about 0 to about 1. A cylindrical-shaped proppant with a very low internal to external diameter ratio (d/D) would have almost no flow path through the proppant and the performance would in all respects approach that of a proppant without an internal flow path; however, a proppant of similar overall shape with a high d/D ratio would have a much higher flow capacity, but might not have sufficient strength to support the stress applied to it, so that it may be crushed.

The fluid passing through the proppant can be a hydrocarbon, but the term "fluid" is used broadly herein, and the fluid can be any fluid including but not limited to liquids, gases, emulsions, foams, supercritical fluid, and combinations thereof. In one example, the fluid can include supercritical fluid only. In another example, the fluid can include liquids only. In another example, the fluid can include liquids and gases only, and so on. The terms "via" and "through" are also used broadly as welt. For example, the flow path can allow fluid to flow via the flow path, such as, allow fluid to flow through the proppant (e.g., an internal flow path that is within the proppant, through an external flow path on an outer surface of the proppant and the fluid flows along the external flow path, etc.), around the proppant (e.g., an external flow path on an outer surface of the proppant), or both depending on the location and quantity of flow paths, all of which can increase permeability. Those of ordinary skill in the art will appreciate that the terms "internal", "external", "side", and "end" are used herein to facilitate the discussion, but this language should not limit the scope of the claims. For example, the terms "side" and "end" can be interchangeable depending on the shape of the proppant (e.g. FIG. 3), or there can be more than two ends for a proppant.

In hydraulic fracturing, billions to trillions of proppants can be deposited in newly created fractures, and proppants with internal flow paths as described herein can allow more fluid to flow through the newly created fractures than proppants without any flow paths. For example, fracture permeability can potentially increase by about 2 to about 5 times with a cylindrical shaped proppant with an internal flow path, or about 3 to about 7 times when using space-frame shaped proppants (e.g., with the proppants of FIGS. 3-4), as compared to the permeability of proppants that do not use these designs.

In addition to the increase in permeability, removing material from the proppant to create a flow path can reduce the mass of the proppant. The reduction in the mass of the proppant can reduce the amount of material needed to manufacture the proppant. The reduction in the mass of the proppant can also reduce shipping costs. In hydraulic fracturing, billions or trillions of proppants can be manufactured in one country and shipped to a hydraulic fracturing site in a different part of the country, in another country, or on another continent. The proppants with the flow paths as described herein can increase fracture permeability, can be manufactured with less material, and can be shipped at a lower shipping cost than proppants without any flow paths.

As previously discussed, the proppant with the flow path can be used in hydraulic fracturing. For example, a plurality of the proppant with the flow path can be used in a frac pack or a proppant pack. The proppant is discussed in the context of hydraulic fracturing, but the proppant can be used in other contexts. For example, the proppant can be used for completion of a well (e.g., a plurality of the proppant can be used in a gravel pack for sand control applications). The proppant can be used with hydrocarbon wells. The proppant can be used with other wells, such as water wells. The proppant can be used with practically any subterranean rock formation.

Those of ordinary skill in the art will also appreciate that a proppant can be formed from a variety of naturally-occurring materials such as sand grains or various types of shells and hulls, manufactured materials, or combinations thereof. The decision regarding the material to be used is based on the cost of the material, the strength, and/or the permeability that will result when the material is used in a fracture. For all known fracturing materials, the permeability of the material decreases as the stress that is applied to the proppant increases. This has led to the development of higher-strength proppants made from man-made materials. Man-made materials that have commonly been used include bauxite, alumina, and/or high-alumina ores. Embodiments herein also pertain to the required strength that can be attained for hydraulic fracturing applications.

In some embodiments, the proppant body may be formed of a material with a compressive strength that is greater than or equal to about 9,000 psi. In some embodiments, the proppant may be formed of a material that is a metal, a metal alloy, a composite material, or any combination thereof. For example, the proppant may be formed of a metal only. For example, the proppant may be formed of a combination of metal and metal alloy. Other examples are also within the scope of this disclosure. In some embodiments, the proppant is formed of a material that has a melting point, a glass transition temperature, or both that is more than or equal to about 500 degrees Fahrenheit.

Figure 5:
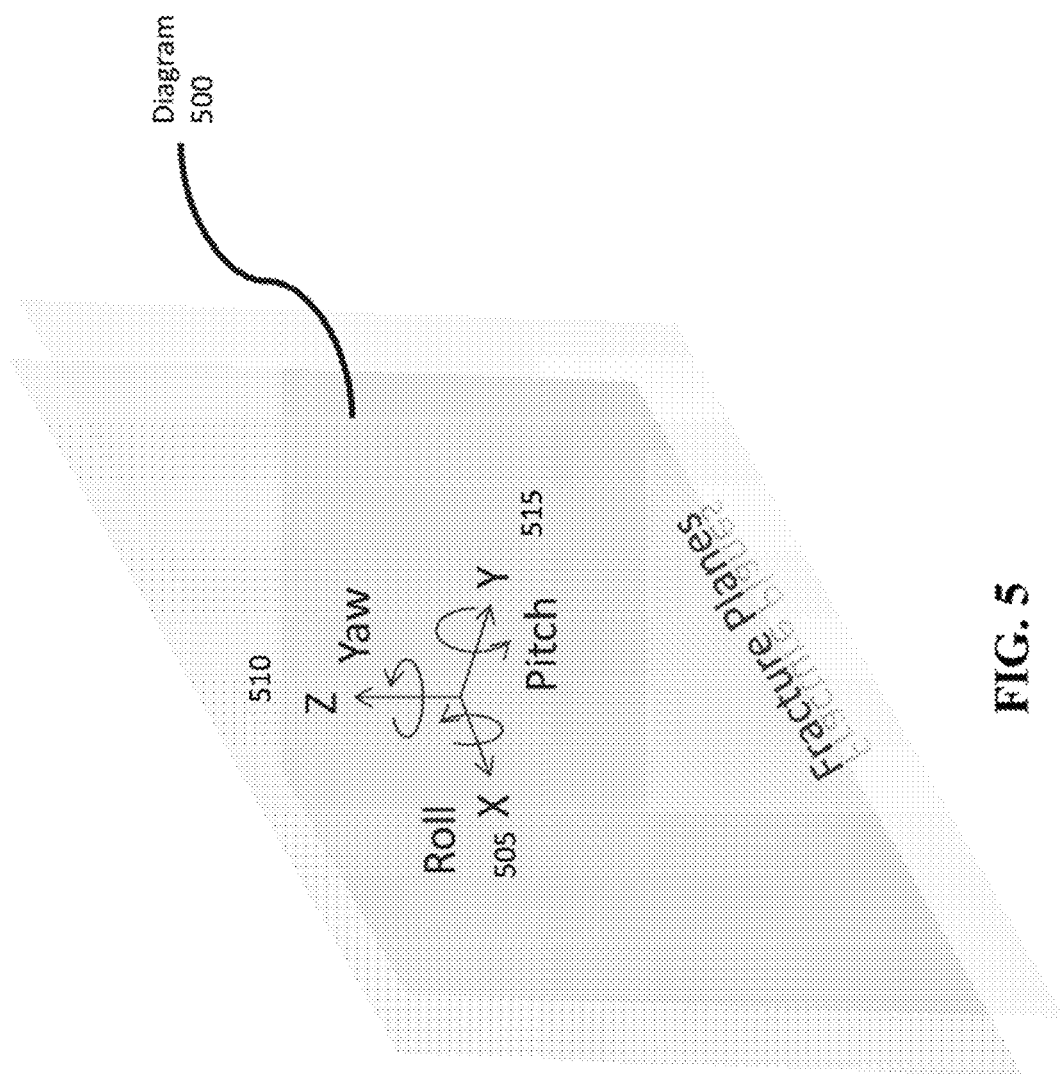
FIG. 5 is a diagram that illustrates definitions of roll, yaw, and/or pitch for a proppant within a fracture.

Turning to the desired orientation of a cylindrical-shaped proppant with a substantially-circular internal flow path. FIG. 5 is a diagram that illustrates the definitions of roll, yaw, and/or pitch for such a cylindrical-shaped proppant. A cylindrical-shaped proppant with an internal flow path can orient towards a variety of positions, for example, orient towards a substantially horizontal position, a substantially vertical position, etc. In FIG. 5, the diagram 500 assumes that the hydraulic fracture is substantially vertical, and the vertical hydraulic fracture has two substantially parallel planes. Furthermore, the diagram 500 assumes a 3D coordinate system with X axis 505 and Z axis 510 in a fracture plane, and Y axis 515 is perpendicular to the fracture plane. Roll, yaw, and pitch are terms used to describe the rotation of a 3D object about these three principle axes, with roll corresponding to rotation about the X axis 505, yaw corresponding to rotation about the Z axis 510, and pitch corresponding to rotation about the Y axis 515. For a substantially cylindrical proppant with an internal flow path, yaw and pitch can be relevant, as is the interaction of multiple different proppants that are in contact with each other or the fracture walls. Yaw and pitch may impact the ability of fluid to flow through and around the proppant within the fracture; however, for a cylindrical-shaped proppant with an internal flow path, roll of the proppant about the X-axis may not have an impact on the ability of fluid to flow. Rotation about the Z-axis of the cylindrical-shaped proppant with an internal flow path will increase the ability of fluid to flow in the direction parallel to the flow path, which is parallel to the fracture. Rotation about the Y-axis may lead to an increase in flow capacity in a direction perpendicular to the fracture, which does not provide any practical value; therefore, rotation of the proppant about the Y-axis is undesirable and should be avoided by carefully designing the proppant so that the length of the proppant is greater than the width of the fracture. Furthermore, in fractures created by hydraulic fracturing, X>>Y and Z>>Y.

The orientation of a cylindrical-shaped proppant with an internal flow path can be affected by the length L to diameter D ratio L/D, where L is measured parallel to the internal flow path, and D is perpendicular to the flow path. For example, the likelihood that a proppant will orient with the internal flow path parallel to a substantially vertical position in the fracture can increase as the value of the L/D ratio decreases. Gravity can also cause a proppant with a small length to orient towards a substantially vertical position. A proppant with a substantially vertical position would be desirable where fluid flows vertically because the flow path would be parallel to the vertical fluid flow.

On the other hand, the likelihood that a proppant will orient towards a substantially horizontal position in the fracture can increase as the result of the L/D ratio increases. Gravity can also cause a proppant with a long length to orient towards a substantially horizontal position. A proppant with a substantially horizontal position would be desirable where fluid flows horizontally in the fracture because the internal flow path would be parallel to the horizontal fluid flow, thus contributing effective flow area in the required direction.

FIGS. 6-9 illustrate how changes in L/D ratio can influence the orientation of a proppant within a fracture. FIGS. 6-9 illustrate results of various drop tests in which items (e.g., PVC items) representing a proppant were dropped through water, air, and glycerin per the table below. Water and glycerine were chosen because they can span the range of viscosity for fluids that are used for hydraulic fracturing, and air was also used to represent a fluid such as natural gas with very low viscosity. PVC was used to construct cylindrical test objects with internal flow paths of different diameters and different L/D ratios. The test objects varied in the proppant body length, the proppant body diameter, the flow path diameter, the L/D ratio, and/or the d/D ratio. Some physical property data for the materials used in the drop tests are listed in the following table.

| Material | Density, gm/cm3 | Viscosity, kg/m-s | Temp., F. | Comment |
|---|---|---|---|---|
| Air | 0.00121 | 0.000018 | 74 | |
| Glycerine | 1.26 | 1.3 | 74 | 99.5% Anhydrous |
| PVC | 1.38 | #N/A | 74 | |
| Water | 0.997 | 0.0009 | 74 | |

Figure 6:
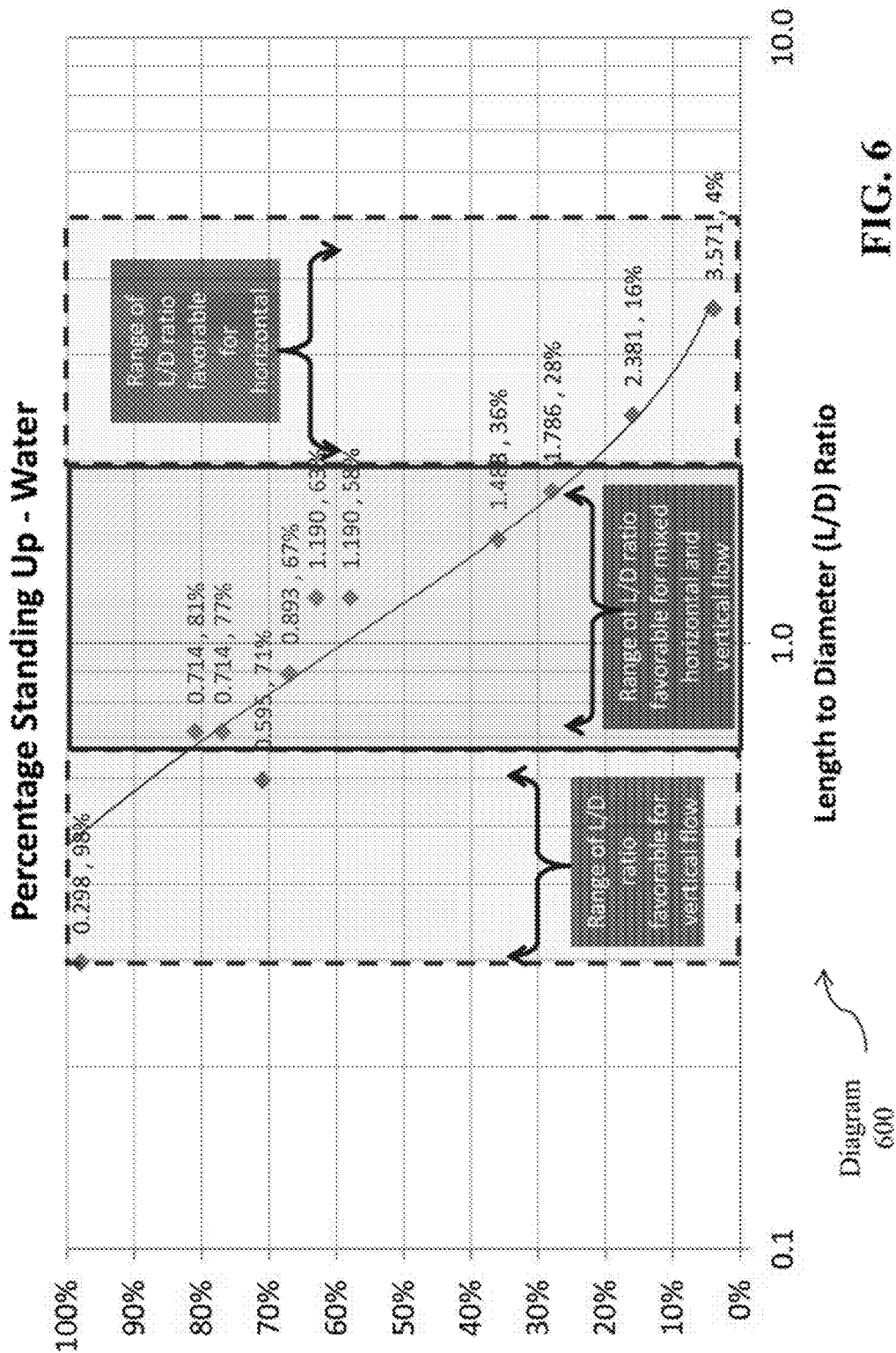
FIGS. 6-8 are diagrams that illustrate example test results of drop tests using water, air, and glycerine, respectively, as the test fluid.

In FIGS. 6-9, the phrase "standing up" indicates that the test objects were oriented so that the internal flow path is vertical or substantially vertical, and the phrase "lying down" indicates that the test objects were not standing up. FIG. 6 includes a diagram 600 that illustrates example test results of drop tests using water as the test fluid. When using test objects with the L/D ratio of 0.298, 98% of the objects came to rest standing up. When using test objects with the L/D ratio of 0.893, 67% of the objects came to rest standing up, and so on.

Figure 7:
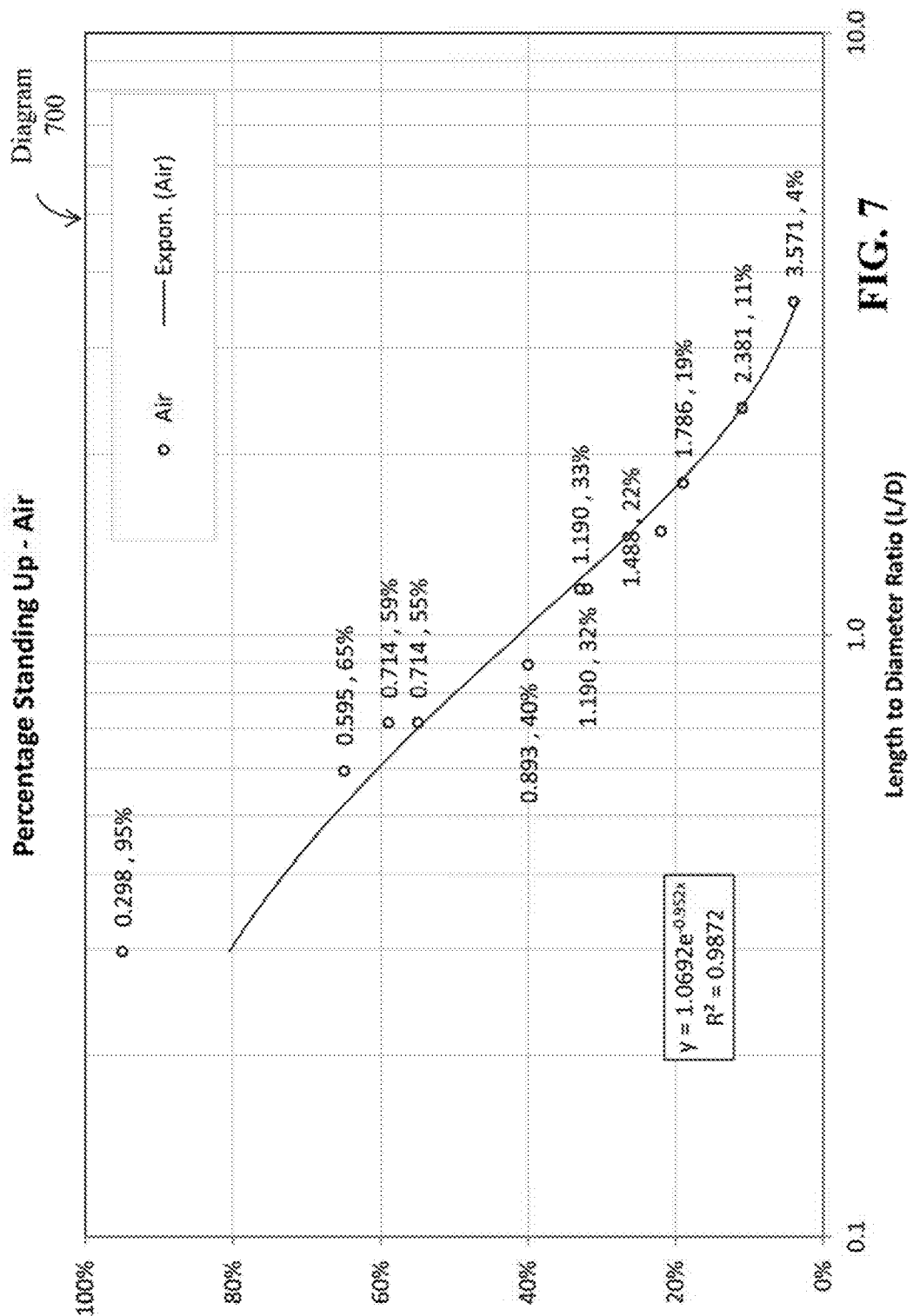

Similarly, in FIG. 7, which includes a diagram 700 that illustrates example test results of drop tests using air as the test fluid, the L/D ratio of 0.298 resulted in 95% of the objects coming to rest standing up. The L/D ratio of 0.595 resulted in 65% of the objects standing up, and so on.

Figure 8:
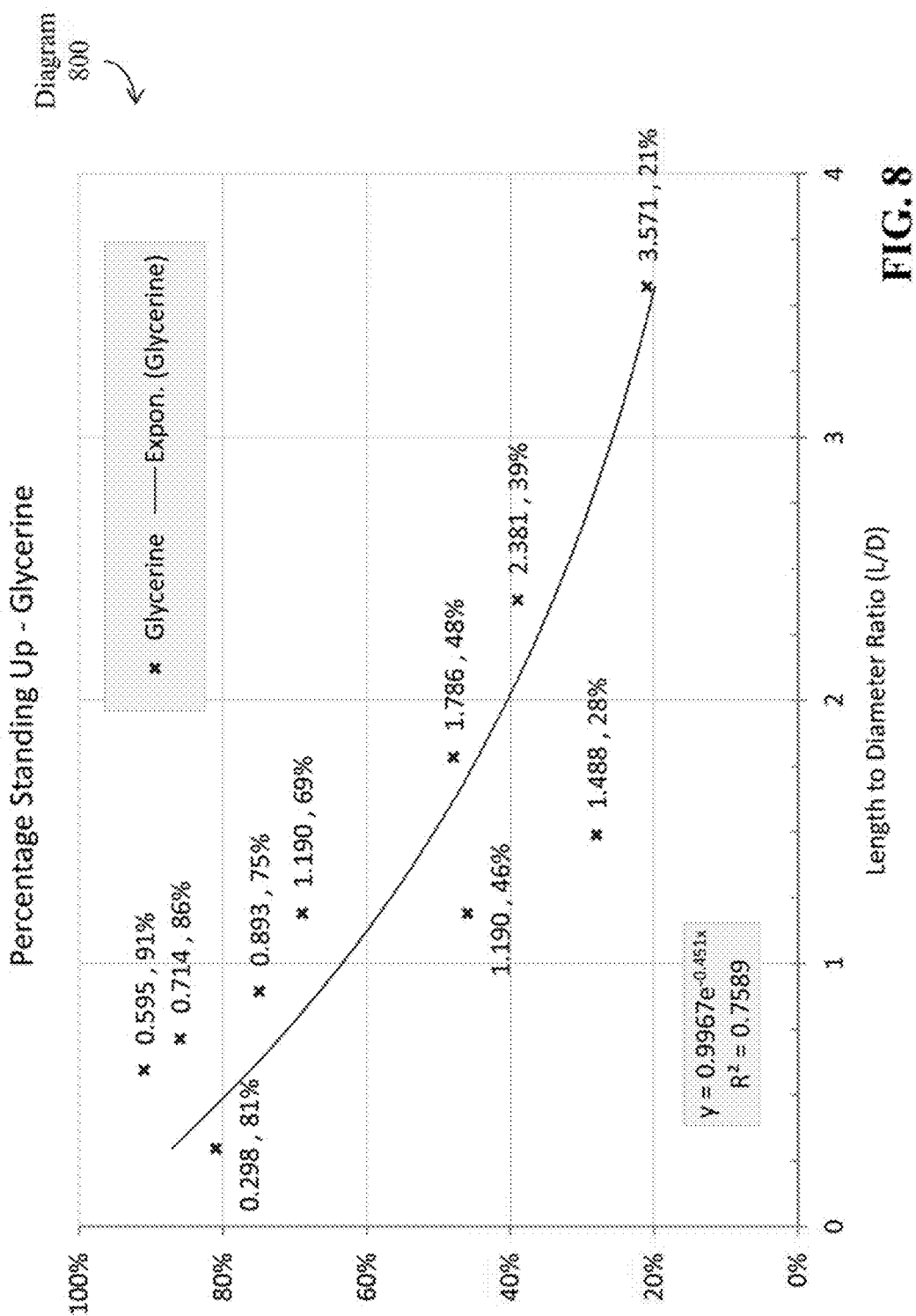
Figure 9:
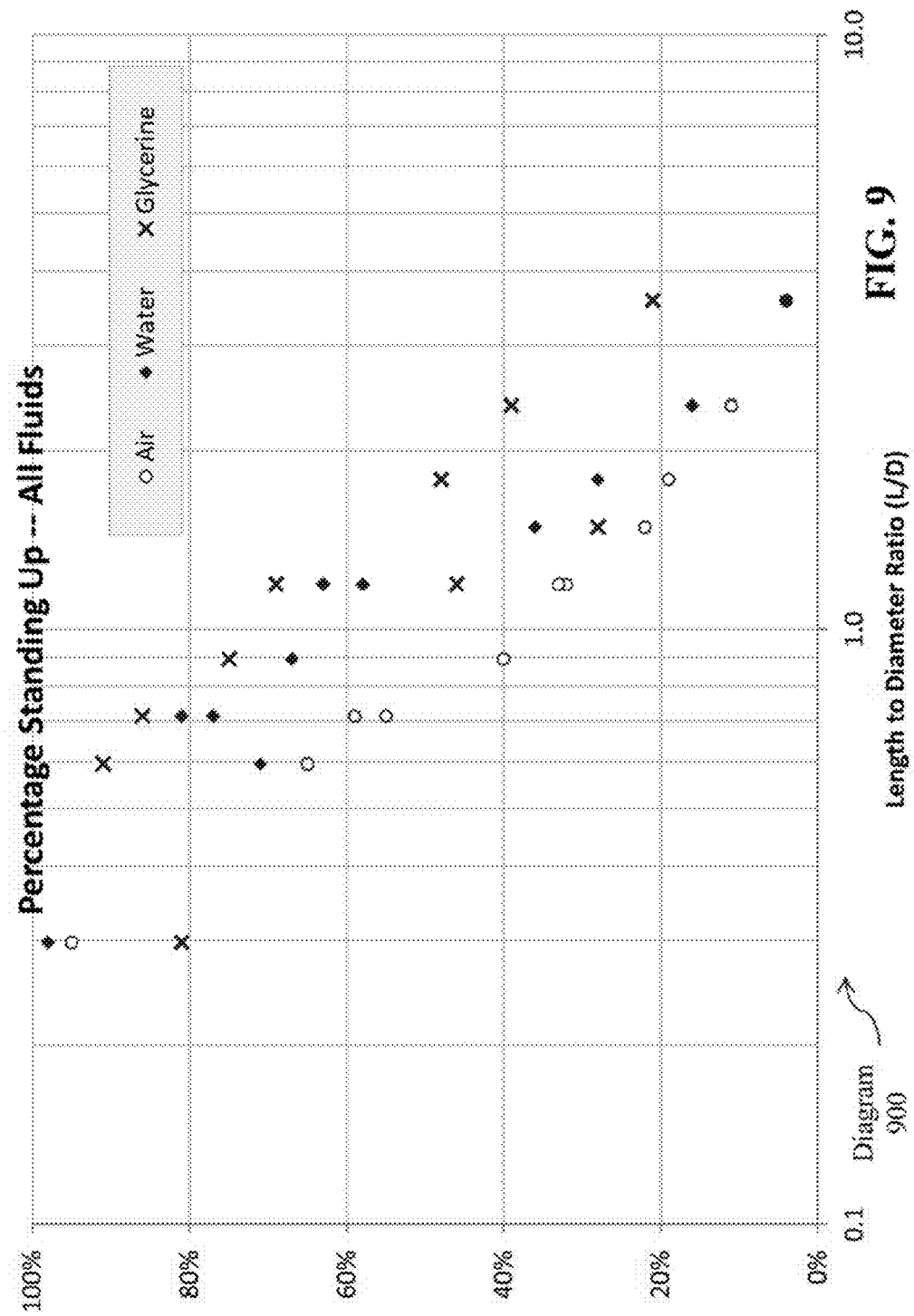
FIG. 9 is a diagram that combines data from the various drop tests of FIGS. 6-8.

Similarly, in FIG. 8, which includes a diagram 800 that illustrates example test results of drop tests using glycerine as the test fluid, the L/D ratio of 0.595 resulted in 91% of the objects coming to rest standing up. The L/D ratio of 1.190 resulted in 69%, and so on. In short, the likelihood that a proppant can orient towards a substantially vertical position can be increased to about 90% or more if the L/D ratio equals about 0.5 or less (as illustrated in FIG. 6 for water).

Moreover, as illustrated in FIG. 6, with drop tests involving water, the L/D ratio of 3.571 results in a corresponding percentage of items lying down of 96%, an L/D ratio of 1.488 results in a corresponding percentage of the items lying down of 64%, and so on. Similarly, in FIG. 7, with drop tests involving air, the L/D ratio of 3.571 results in a corresponding percentage of items lying down of 96%, the L/D ratio of 0.893 results in a corresponding percentage of the items lying down of 60%, and so on. Similarly, in FIG. 8, with drop tests involving glycerine, the L/D ratio of 3.571 results in a corresponding percentage of items lying down of 79%, the L/D ratio of 2.381 results in a corresponding percentage of items lying down of 61%, and so on. Positions that are lying down can be considered to be substantially horizontal positions. In short, the likelihood that a proppant can orient towards a substantially horizontal position (lying down) can be increased to 90% or more if the result of the L/D ratio equals about 3 or more (as illustrated in FIG. 6 for water).

Furthermore, FIG. 6 illustrates, with drop tests involving water, the ranges of L/D ratio that are more favorable for horizontal flow, vertical flow, or mixed horizontal and vertical flow in the fracture. By varying the L/D ratio when designing and manufacturing a proppant, including the values of the proppant body length and the proppant body diameter thereof, the likelihood that a proppant will orient towards a desired orientation can be increased. The data from the various drop tests of FIGS. 6-8 is combined in diagram 900 in FIG. 9. Thus, in some embodiments, the proppant body may have a length (L) and an outside diameter (D), and the proppant body length (L) to the proppant body outside diameter (D) ratio (L/D) may be about 0.3 to about 5.0 for a proppant with a space frame or a proppant with a substantially cylindrical proppant body with a substantially circular cross-sectional area and an internal flow path with a substantially circular cross-sectional area.

Figure 10:
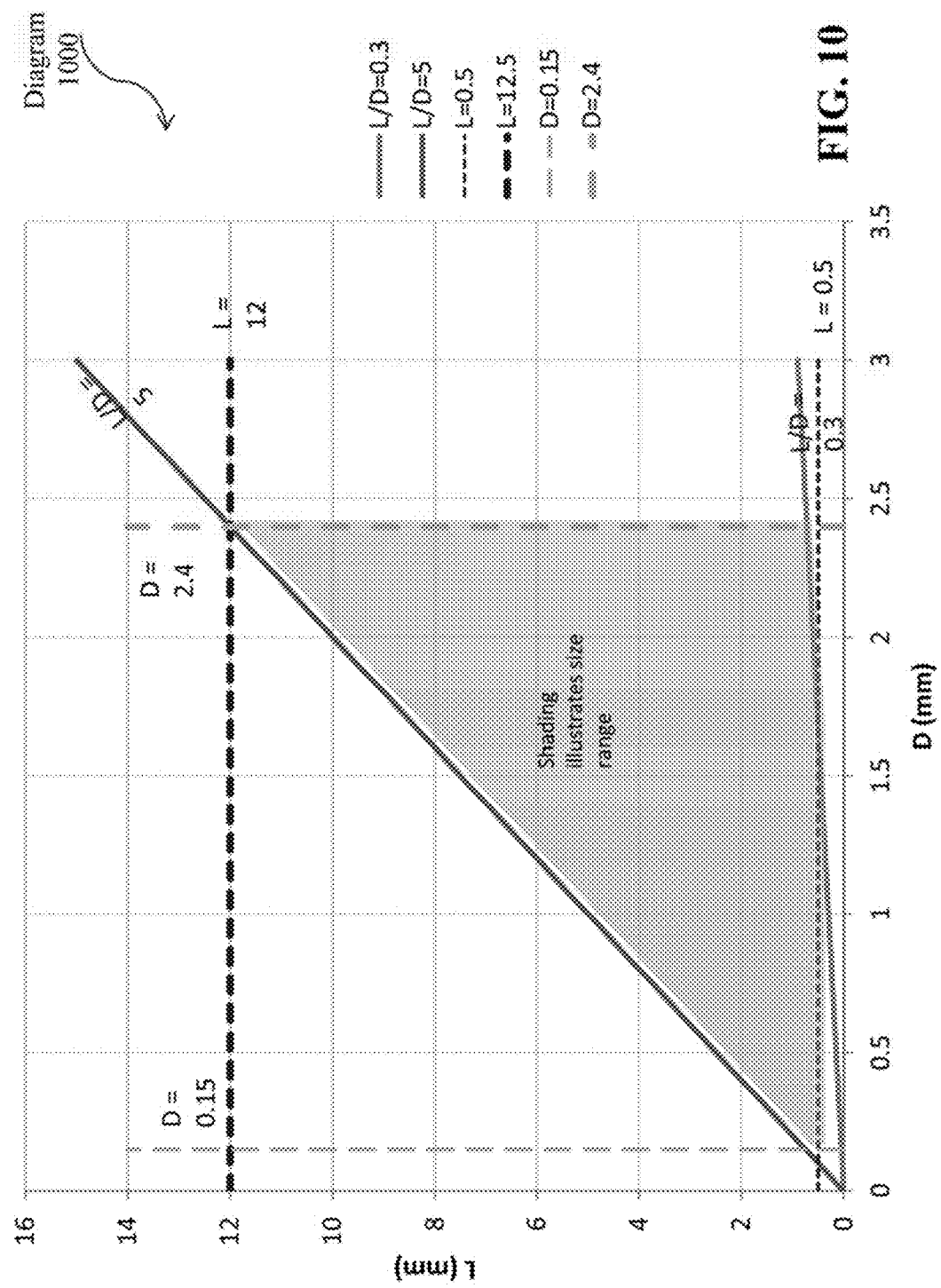
FIG. 10 is a diagram that illustrates an example of a proppant body diameter range, a proppant body length range, and a L/D ratio range for a proppant.

Turning next to size ranges for a proppant, including the ranges for the proppant body length and for the proppant body diameter, FIG. 10 is a diagram 1000 with an example of desired ranges for a proppant. However, those of ordinary skill in the art will appreciate that the terms "desirable", "desired", "favorable", and "preferred" should not limit the scope of the appended claims, and the terms are simply used herein to facilitate the discussion. The desired range for the proppant body diameter can be controlled by the distance between the fracture planes when hydraulic fracturing is conducted, also known as the fracture width, by the in situ stresses in the earth where the hydraulic fracturing is conducted which influences the fracture width, and for wells with casing, by the size of the opening in the casing through which the proppant must travel to reach the fracture. The desired range for the proppant body diameter can correspond to the range of proppant body diameter that is known to those skilled in the art of hydraulic fracturing. The smallest fractures or highest in situ stress fractures can use a proppant body diameter of approximately 0.15 mm, and the largest fractures or lowest in situ stress fractures can use a proppant body diameter of about 2.4 mm, or about 16 times greater diameter than the smallest proppants.

Regarding the proppant body length, very long proppants have an increased opportunity for breakage during the hydraulic fracturing operation such as when traveling through the surface pumping equipment, and long proppants can also contribute to bridging (i.e., undesirable accumulation that prevents additional proppants from passing that location) of the proppants within the connection between the well and the fracture or within the fracture itself. Therefore, the proppant body length can be as long as needed to achieve the desired orientation within the fracture as illustrated in FIGS. 6-9, but preferably not substantially longer than needed to achieve the desired orientation. As previously discussed in conjunction with undesirable yaw orientation 510, the shortest desirable proppant body length can be determined by the narrowest created fracture width during hydraulic fracturing. It is not desirable for the proppant length L of a cylindrical-shaped proppant with an internal flow path to be small enough that the proppant can be oriented perpendicular to the fracture direction.

Those skilled in the art of hydraulic fracturing have many methodologies at their disposal to determine the widths of hydraulic fractures. For example, experiments have been conducted whereby full scale fractures have been created using specially marked fluids and (proppants in an underground formation adjacent to a cliff face, and the cliff face has been mined away to reveal the width of the propped fractures. Mechanical strength property data for the formations was also collected so that fracturing simulators could be calibrated against these full scale tests. Fracture fluid and proppants can be marked so that they can be detected near the wellbore using special logging tools run after a fracturing treatment is completed. Logging tools with cameras have also been used to observe the width of fractures at the wellbore in real time, as the fractures are being created. Also, in order to prevent bridging of proppants flowing through a fracture, it is known to those skilled in the art of hydraulic fracturing that the fracture must be wider than approximately 3 times the average proppant body diameter, which explains why fluid without proppant, called "pad fluid", is injected before proppant is added to the fluid, to allow the fracture to develop sufficient width so that proppant can be pumped into the fracture without the occurrence of bridging.

Thus, it is desirable for the created hydraulic fracture width to be greater than three times the average proppant diameter of the smallest proppant body diameter with a value of 0.15 mm. Furthermore, it is desirable for a proppant to have the proppant body length longer than the created fracture width to avoid the undesirable yaw orientation 510; therefore in some embodiments the shortest proppant body length can be greater than 3 times 0.15 mm, and therefore approximately 0.5 mm is the minimum desired proppant body length that satisfies all of the above criteria. The longest desirable proppant body length is the largest proppant body diameter or about 2.4 mm, times the greatest L/D ratio value 5 that can achieve sufficient probability of the desired proppant orientation in the fracture, yielding a largest desirable proppant body length of 12 mm in some embodiments. In some embodiments, the proppant body has a length (L) of about 0.5 mm to about 12.0 mm (e.g., in a proppant with a substantially cylindrical proppant body with a substantially circular cross-sectional area and an internal flow path with a substantially circular cross-sectional area). In some embodiments, the proppant body is substantially spherical with the outside diameter from about 0.15 mm to about 2.4 mm. In some embodiments, the proppant body is elongated with the outside diameter from about 0.15 mm to about 2.4 mm and the length from about 0.5 mm to about 12.0 mm. In some embodiments, the proppant body has an outside diameter of about 0.15 mm to about 2.4 mm.

Turning to the desired range of overall width W 330 for a substantially spherical skeletal polyhedron proppant 300 as seen in FIG. 3 or the overall width W 415 for an elongated skeletal polyhedron proppant 400 as seen in FIG. 4, the overall width W can be the same range of desirable (D) or proppant body diameter as for any proppant as shown in FIG. 10, and for the same reasons. Furthermore, the desirable (L) or overall length 420 range and L to (W) or overall width 415 ratio (L/W) has the same range as the desired proppant body length range L and proppant body length to proppant body diameter ratio (L/D) respectively for any proppant as shown in FIG. 10, and for the same reasons.

To summarize, in some embodiments, the desirable proppant body diameter range, the desirable proppant body length range, and the desirable L/D ratio range for any proppants consistent with the disclosure are illustrated by the shaded area in example diagram 1000 in FIG. 10. Furthermore, the specific proppant body diameter, proppant body length, and L/D ratio used for a particular fracturing treatment can depend on the physical properties of the fracturing fluid and the physical properties of the formation in which the fracturing operation is conducted.

Turning next to desired strength and desired flow area, in addition to designing the L/D ratio of a proppant to achieve the desired orientation lying down or standing up orientation, a proppant can also be created with a desired strength and with a desired permeability or flow area. Although there are differences between permeability and flow area, flow area may be used as a proxy for permeability for purposes of this discussion. Also, for purposes of this discussion, "desired strength" refers to resistance to crushing, where crushing would result in a substantial decrease in the overall proppant body diameter and the internal flow path diameter of a cylindrical-shaped proppant with an internal flow path.

The desired strength can affect the desired permeability or flow area of a proppant, and vice versa, so these items will be discussed together. As an example, the flow path diameter can be decreased in order to increase the strength of a proppant. As another example, the strength may be increased without changing the internal flow path diameter, if a stronger material is used. By increasing strength of a proppant, the proppant can also be less likely to break apart into two or more proppant fragments as the proppant passes through a pump, passes through a perforation in a wellbore casing, or after being deposited when exposed to stress from the formation when the fracture face is in contact with the proppant. On the other hand, the flow path diameter of the internal flow path can be increased in order to increase the flow area of a proppant. By starting with a material of substantially greater strength than would be needed for a proppant without an internal flow path, a proppant with the flow path can be created that has sufficient strength, but with greater flow area than would be attainable in the absence of one or more internal flow paths of a proppant.

Two simplified examples will be used to illustrate the impact of internal flow path diameter on flow area. The first example is that of multiple cylindrical-shaped proppants that are stacked in a triangular stacking arrangement. A triangular stacking arrangement can be described as one where a proppant lies directly beside two other proppants, but it is offset by one radius distance from the proppants lying above it and below it, and all the proppants are parallel to one another. One of ordinary skill in the art will appreciate that the flow area $A_{fs}$ parallel to three solid cylindrical-shaped proppants of radius R with no internal flow path can be determined using the following equation:

$$A_{fs} = R^2\left(\sqrt{3} - \frac{\pi}{2}\right)$$

One of ordinary skill in the art can also appreciate that the flow area $A_{fh}$ for a cylindrical-shaped proppant with outer radius R with an internal flow path with inner radius r can be determined using the following equation:

$$A_{fh} = R^2\left(\sqrt{3} - \frac{\pi}{2}\right) + r^2\left(\frac{\pi}{2}\right)$$

One of ordinary skill in the art may appreciate that the ratio of flow area for the proppant with an internal flow path to that of the flow area for the proppant without an internal flow path is given by the following equation, wherein the flow area ratio ($A_{fh}/A_{fs}$) depends on the radius ratio (r/R):

$$\frac{A_{fh}}{A_{fs}} = 1 + \left(\frac{\frac{\pi}{2}}{\sqrt{3} - \frac{\pi}{2}}\right)\left(\frac{r}{R}\right)^2$$

The second example to be examined is that of multiple cylindrical-shaped proppants stacked in a cubic packing arrangement. The cubic packing arrangement can be described as one in which a proppant lies directly above and parallel to another proppant, and directly beside two other proppants, and directly below another proppant with all proppants being parallel to one another. One of ordinary skill in the art may appreciate that the open flow area between four cylindrical-shaped proppants in a cubic stacking arrangement can be calculated with the following equation, $$A_{fs} = (4-\pi)R^2$$

and the flow area for four cylindrical-shaped proppants with internal flow paths can be calculated by the following equation:

$$A_{fh} = (4-\pi)R^2 + \pi r^2$$

The flow area ratio for proppants with internal flow paths versus proppants without internal flow paths for the cubic stacking arrangement can be determined using the following equation, wherein the flow area ratio ($A_{fh}/A_{fs}$) depends on the radius ratio (r/R):

$$\frac{A_{fh}}{A_{fs}} = 1 + \frac{\pi}{4-\pi}\left(\frac{r}{R}\right)^2$$

Note that for calculation or discussion purposes, the radius ratio (r/R) described above is entirely interchangeable with the inside diameter d to outside diameter D ratio (d/D).

Figure 11:
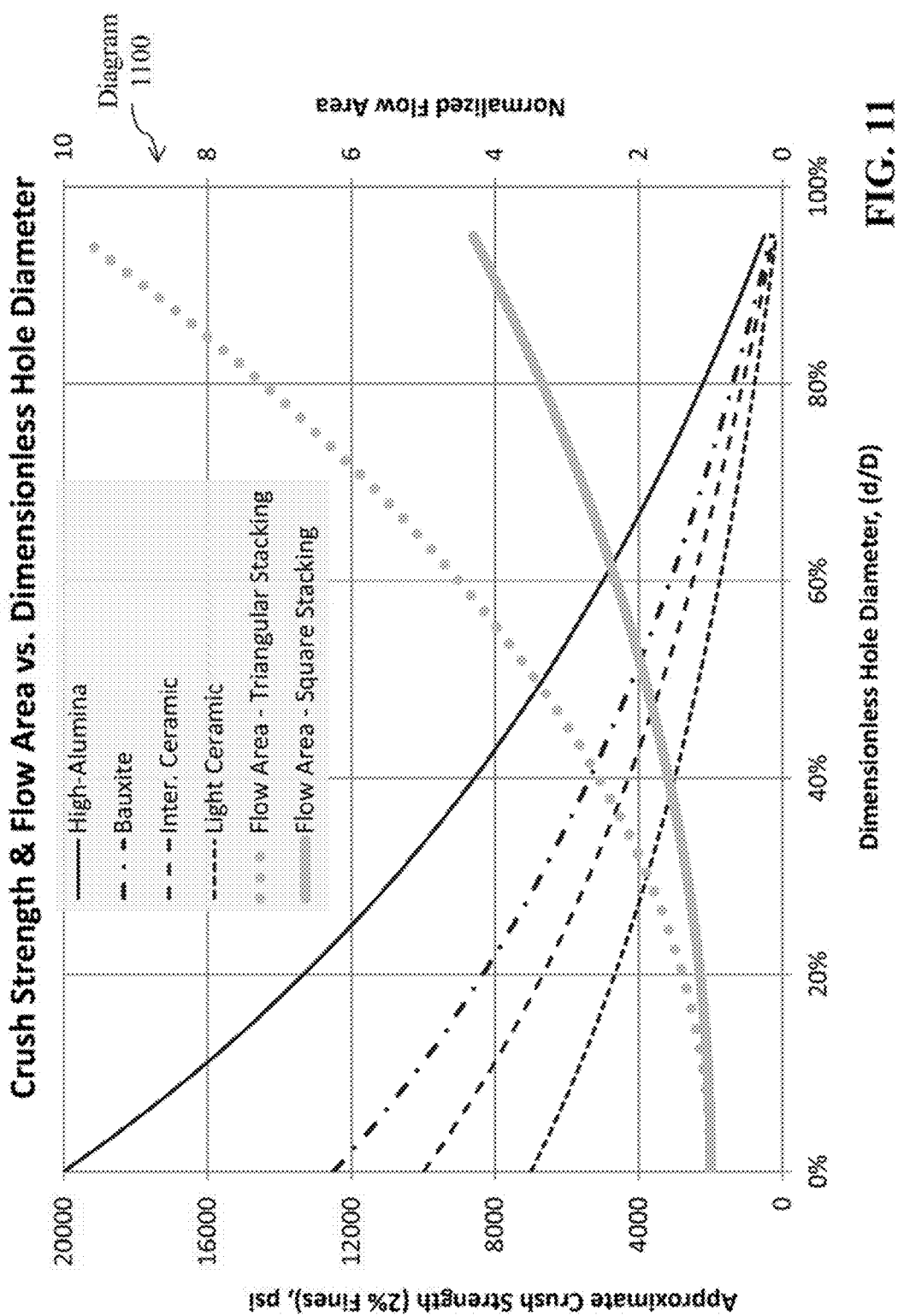
FIG. 11 is a diagram that illustrates an example of calculated proppant crush strength and normalized flow area for proppants with triangular and cubic stacking as a function of a diameter ratio (d/D) for proppants made from various materials.

FIG. 11 with diagram 1100 illustrates an example of calculated proppant crush strength and normalized flow area for triangular and cubic stacking as a function of the diameter ratio (d/D) for proppants made from various materials. The materials include high-alumina, bauxite, and intermediate strength ceramic. The crush strength for a proppant with no internal flow channel is taken to be the same as the crush strength of a spherical particle of proppant, using manufacturer's data. The crush strength for a proppant with the internal flow path is calculated using Timoshenko's formula for the collapse strength of a thick-walled cylinder. By normalized flow area ratio, it is meant that the ratio of a proppant with the internal flow path of a given d/D ratio divided by the flow area of a proppant with the same proppant body diameter, but with no internal flow path.

Figure 12:
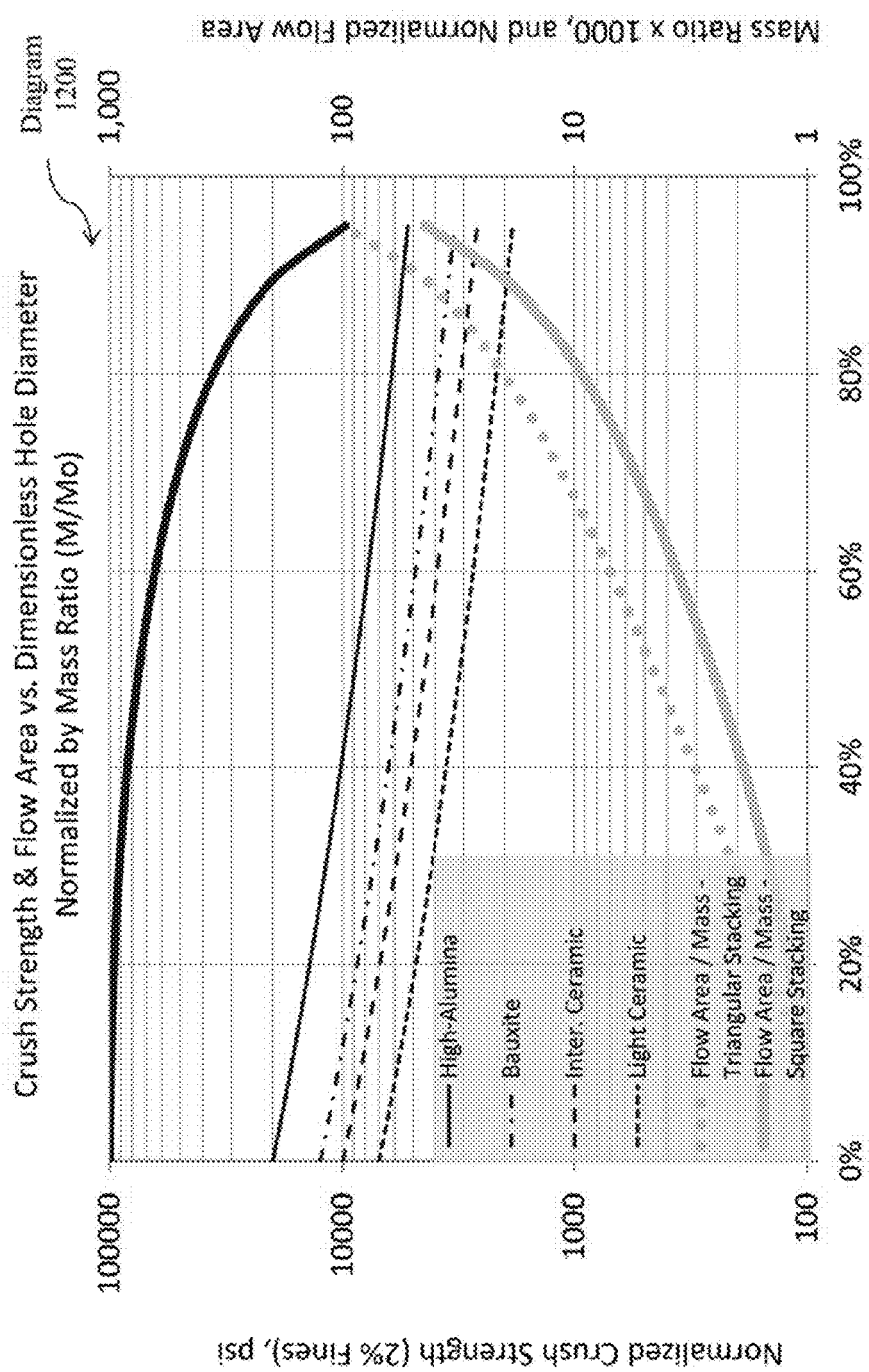
FIG. 12 is a diagram that illustrates the results as in FIG. 11, except that in FIG. 12, the crush strength and normalized flow areas are further normalized by the mass ratio.

FIG. 12 with diagram 1200 illustrates the same results as FIG. 11, except that in FIG. 12, the crush strength and normalized flow areas are further normalized by the mass ratio. The mass ratio is defined as the mass of a proppant with no internal flow path divided by the mass of a proppant with the internal flow path for a given d/D ratio. This figure shows the crush strength and the flow area performance based on the amount of money invested in proppant raw material and transportation costs. Of note, the value of mass ratio is multiplied by 1000 to facilitate plotting on the same axis with the flow area.

Figure 13:
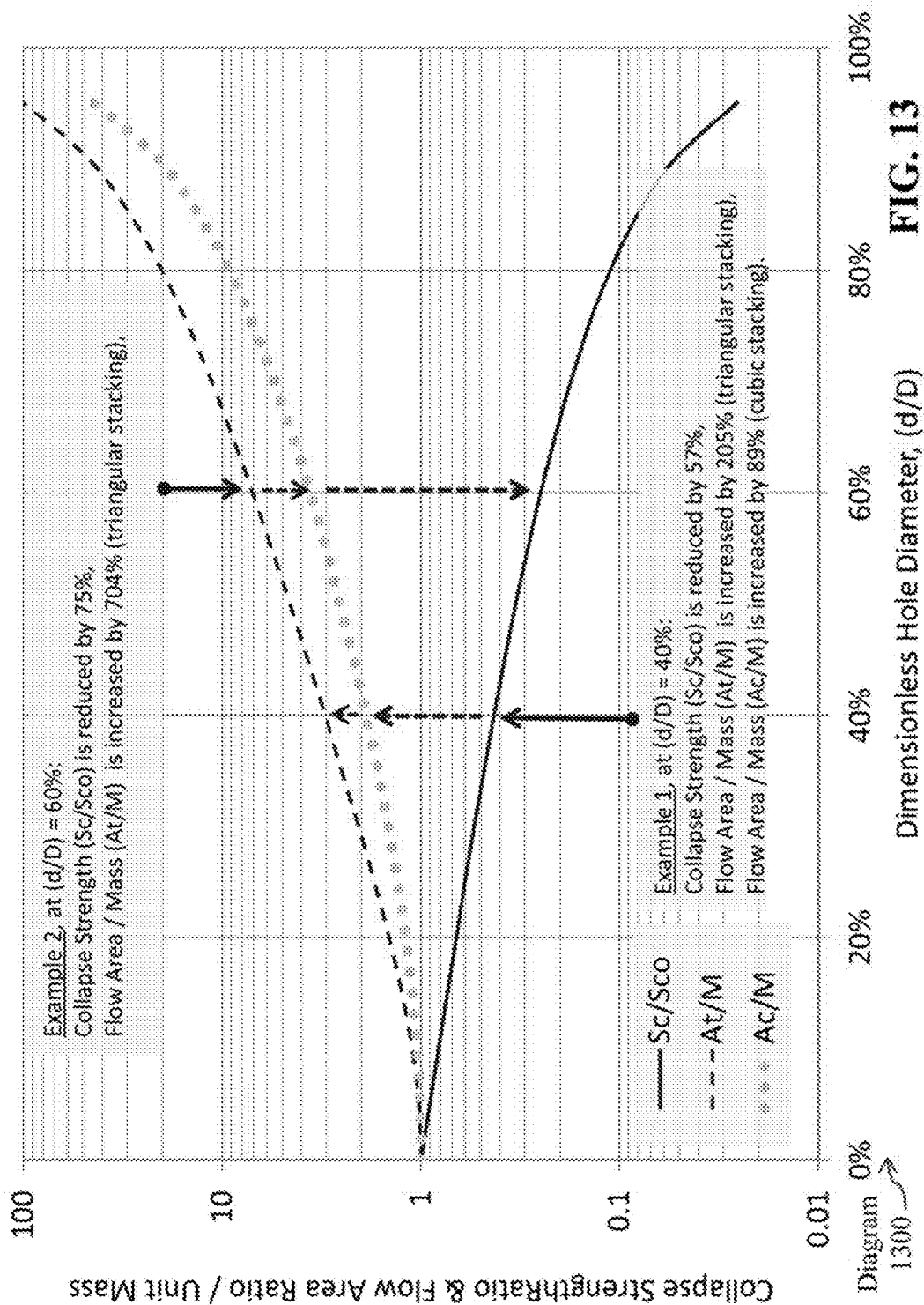
FIG. 13 is a diagram with examples of collapse strength and flow area/mass.

FIG. 13 with diagram 1300 illustrates examples of the impact of diameter ratio d/D and flow area per unit of mass on collapse strength. In the first example, when the d/D ratio equals 40%, the collapse strength is reduced by 57% and flow area/mass ratio is increased by 89% for cubic stacking and 205% for triangular stacking. In the second example, when the d/D ratio equals 60%, the collapse strength is reduced by 75% and flow area/mass is increased by 262% for cubic stacking and 704% for triangular stacking.

Turning next to desired pitch orientation 515 from FIG. 5 of a proppant within a hydraulic fracture 110 as shown in FIG. 1, and far from the horizontal well 140, most flow can be horizontal; therefore, many proppants lying in substantially horizontal pitch 515 orientations (i.e., lying down) can be beneficial by providing greater flow area in the horizontal direction, parallel to the direction most of the fluid is flowing. On the other hand, there can be a significant vertical component to the flow closer to the horizontal well 140 as fluid converges to the horizontal well 140, which is of short vertical height compared to the reservoir 130 and the fracture 110, and therefore, some proppants lying in substantially vertical pitch orientations 515 can be beneficial to increase the flow area for fluid flowing in a vertical direction. As discussed above, the proppants with smaller length L to diameter D ratio L/D tend to stand up more than longer lengths. For hydraulic fracturing operations where fractures that are much longer than they are tall are expected to be created, it can be advantages to use longer proppants with greater L/D ratios in the beginning stages of hydraulic fracturing with a shift to somewhat shorter proppants with lesser L/D ratios in the ending stages of hydraulic fracturing.

Turning to crush resistance, a flow path (e.g., the internal flow path) can result in weakening relative to a proppant with no flow path; however, this weakening can be offset by using a stronger base material to manufacture the proppant. In the past, more dense materials (e.g., metals) have not found significant commercial use as proppants due to the difficulty of suspending very dense objects in slurry and transporting them far down a hydraulic fracture, as well as their higher cost. However, the lesser amount of material and higher surface area of the proppants 300 and 400 can make it feasible to use such dense materials. Materials of high strength to weight ratio can be desirable for use in rigid members for the proppants 300 and 400, including such metals as steel, aluminum, titanium, scandium, and the like, and also composite materials such as carbon fiber and others. Furthermore, as discussed herein, additive manufacturing can be used to manufacture the proppants.

Turning to cost, some of the proppant designs described herein can lead to using more expensive materials. However, the additional cost can be partially or even more than fully compensated by the fact that less material can be used due to the flow paths of the proppants described herein.

Provided herein are also embodiments of methods of making proppants and methods of hydraulic fracturing. Those of ordinary skilled in the art will appreciate that fracturing proppants can be manufactured in many different ways. In addition to previously known methods, it can be advantageous to use additive manufacturing, also referred to as 3D printing, to manufacture proppants such as, but not limited to, the proppants described herein. For example, it can be advantageous to use additive manufacturing to generate the small sizes and geometric complexities of the proppants described herein. For example, additive manufacturing can be used to manufacture the proppants described herein (e.g., a proppant with a space frame or a proppant with a substantially cylindrical proppant body with a substantially circular cross-sectional area and an internal flow path with a substantially circular cross-sectional area) from metals, metal alloys, ceramics, other materials, combinations thereof, etc.

Figure 14:
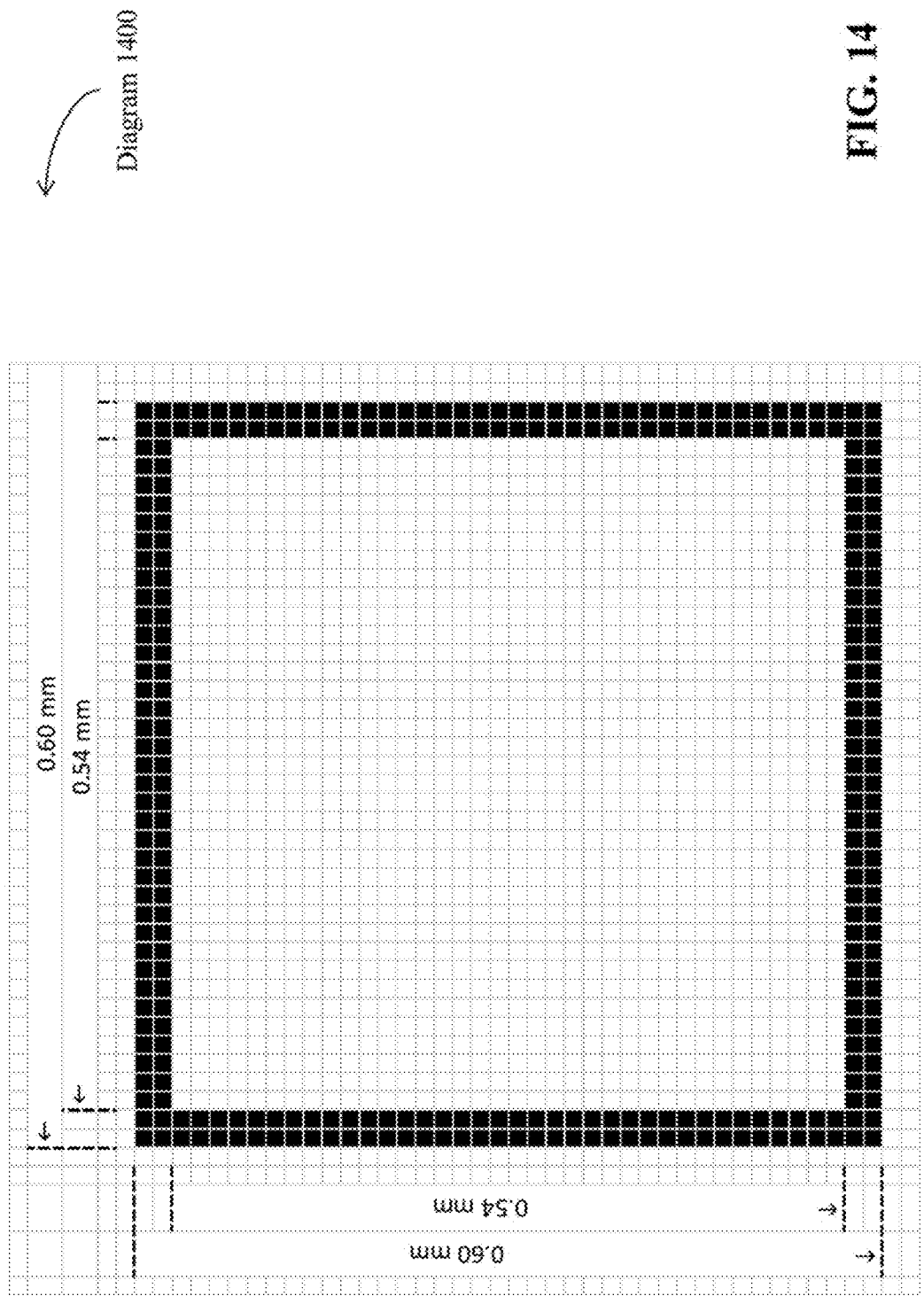
FIG. 14 illustrates an example of a square frame portion of the proppants of FIGS. 3-4 that can be made using additive manufacturing.

FIG. 14 illustrates an example 1400 of a square frame portion of the polyhedron proppant or the multi-polyhedral proppant that can be made using additive manufacturing. The small squares in the example 1400 are 0.015 mm by 0.015 mm. The example 1400 illustrates the manufacture of a single square frame measuring 0.6 mm by 0.6 mm of the irregular polyhedron proppant 300, with the rigid member diameter 310, respectively, of 0.03 mm.

Figure 15:
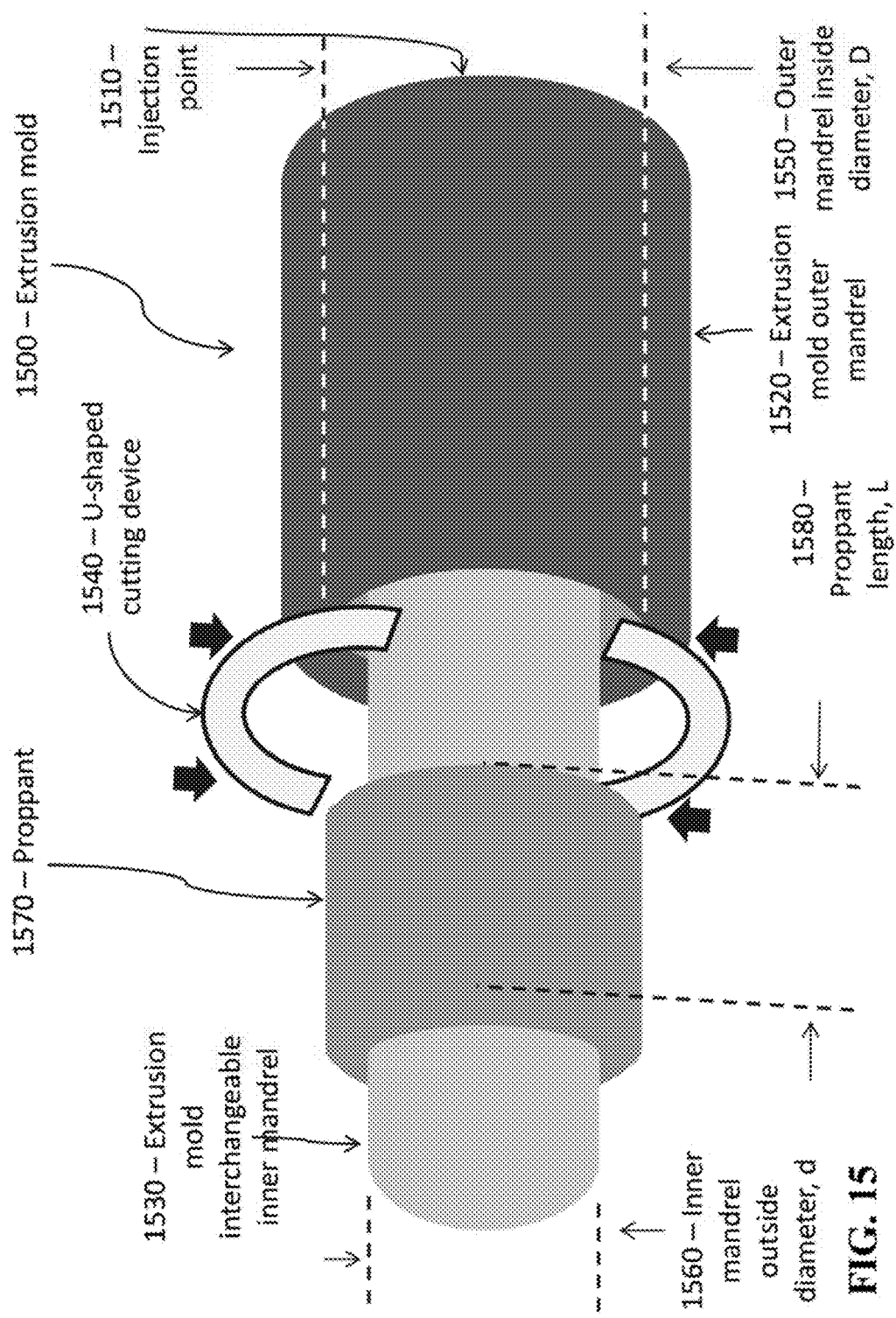
FIG. 15 illustrates an embodiment for an apparatus for manufacturing hollow-cylinder shaped proppants using extrusion molding.

For another example, extrusion molding can be used to manufacture proppants described herein. FIG. 15 illustrates an embodiment of an apparatus 1500 that can be used to manufacture hollow-cylinder shaped proppants (e.g., a proppant with a substantially cylindrical proppant body with a substantially circular cross-sectional area and an internal flow path with a substantially circular cross-sectional area). The apparatus 1500 consists of an extrusion mold with an injection point 1510 on one end where slurried material can be continuously injected at whatever rate is needed to allow the appropriate amount of heating or cooling to occur, resulting in a properly formed finished product. The mold has an outer mandrel 1520 that has an internal diameter D 1550 which corresponds to the desired outside diameter D for the proppant being made. If necessary, the outer mandrel can include a heating element or a cooling mechanism to control the forming time for the proppant being made. The mold 1500 also includes an interchangeable inner mandrel 1530 with an outside diameter d 1560 which corresponds to the inside diameter d of a cylindrical-shaped hollow proppant. By using molds 1500 with different outer mandrel inside diameters 1520 and by using different diameter interchangeable inner mandrels 1530, all desired sizes of proppant can be made. The mold 1500 also includes a U-shaped cutting device 1540 that is used to cut each proppant 1570 to the desired proppant length 1580.

Thus, proppants for hydraulic fracturing may be made from extrusion molding using an apparatus. The apparatus may include a mold, and the mold includes an outer mandrel that has an inside diameter corresponding to a desired outside diameter of proppants being made. The apparatus may also include an inner mandrel with an outside diameter that corresponds to a desired inside diameter of the proppants being made, a continuous injection point attached to the outer mandrel on one end of the outer mandrel, and a cutting device with opposing u-shaped blades at the other end of the outer mandrel that can be used to cut the proppants to the desired length. Furthermore, the inner mandrel may be interchangeable to allow manufacturing hollow-cylinder shaped proppants of differing inside diameters.

Characteristics of proppants include their permeability, crush resistance, chemical resistance, thermal stability, and costs. The proppants described herein can be advantageous with regard to increased flow area and permeability as discussed herein. Furthermore, the proppants described herein are not disadvantaged with respect to chemical resistance or thermal stability as compared to proppants with no internal flow paths. Proppants consistent with this disclosure may be included in hydraulic fracturing fluid, and the hydraulic fracturing fluid may be injected into a subterranean hydrocarbon bearing formation.

Various embodiments have been described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The invention claimed is:

1. A proppant for hydraulic fracturing, the proppant comprising:
   a proppant body,
   wherein the proppant body has a length (L) and an outside diameter (D),
   wherein the proppant body length (L) to the proppant body outside diameter (D) ratio (L/D) is about 0.3 to about 5.0,
   wherein the proppant body comprises a space frame,
   wherein the space frame is a three-dimensional structural framework which is designed to behave as an integral unit and to withstand loads applied at any point, and
   wherein the space frame comprises a plurality of rigid members creating a plurality of openings, the plurality of openings allowing fluid to flow through the proppant thereby increasing permeability.

2. The proppant of claim 1, wherein at least one rigid member of the plurality of rigid members is made of a material that is a metal, a metal alloy, a composite material, or any combination thereof.

3. The proppant of claim 2, wherein the material has a melting point, a glass transition temperature, or both that is more than or equal to about 500 degrees Fahrenheit.

4. The proppant of claim 1, wherein at least one rigid member of the plurality of rigid members includes a flow path through the rigid member.

5. The proppant of claim 4, wherein at least a portion of the flow path through the rigid member is filled with an agent.

6. The proppant of claim 5, wherein the agent is dissolvable, and wherein the fluid can flow via the flow path through the rigid member after the agent dissolves.

7. The proppant of claim 5, wherein the agent is removable, and wherein the fluid can flow via the flow path through the rigid member after the agent is removed.

8. The proppant of claim 5, wherein the agent is a polymer, a surfactant, a fracturing gel breaker, a scale inhibitor, a corrosion inhibitor, a paraffin inhibitor, a hydrate inhibitor, an asphaltene inhibitor, an emulsion inhibitor, a mutual solvent, a clay stabilizer, a tracer, or any combination thereof.

9. The proppant of claim 1, wherein the proppant body is substantially spherical with the outside diameter from about 0.15 mm to about 2.4 mm.

10. The proppant of claim 1, wherein the proppant body is elongated with the outside diameter from about 0.15 mm to about 2.4 mm and the length from about 0.5 mm to about 12.0 mm.

11. The proppant of claim 1, wherein the space frame is a regular polyhedra, an irregular polyhedra, or any combination of regular and irregular polyhedra.

12. The proppant of claim 1, wherein at least one proppant of claim 1 is included in a hydraulic fracturing fluid for injection into a subterranean hydrocarbon bearing formation.

13. The proppant of claim 1, wherein the proppant is made by additive manufacturing.

* * * * *